US009503986B2

(12) United States Patent
Wang et al.

(10) Patent No.: US 9,503,986 B2
(45) Date of Patent: Nov. 22, 2016

(54) SYSTEM AND METHOD TO REDUCE POWER CONSUMPTION ASSOCIATED WITH CELL RESELECTION OPERATIONS

(71) Applicant: FutureWei Technologies, Inc., Plano, TX (US)

(72) Inventors: Julia Wang, San Diego, CA (US); Ping Shi, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 59 days.

(21) Appl. No.: 14/045,520

(22) Filed: Oct. 3, 2013

(65) Prior Publication Data
US 2015/0099517 A1 Apr. 9, 2015

(51) Int. Cl.
*H04W 36/00* (2009.01)
*H04W 52/02* (2009.01)
(Continued)

(52) U.S. Cl.
CPC ......... *H04W 52/0258* (2013.01); *H04W 48/16* (2013.01); *H04W 48/20* (2013.01); *H04W 88/02* (2013.01); *Y02B 60/50* (2013.01)

(58) Field of Classification Search
CPC ... H04W 36/30; H04W 36/14; H04W 36/08; H04W 36/12; H04W 48/20; H04W 36/18; H04W 48/16; H04W 36/24; H04W 36/32; H04W 48/18; H04W 36/0088; H04W 36/26; H04W 16/04; H04W 24/02; H04W 24/04; H04W 36/0072; H04W 36/02; H04W 36/36; H04W 48/04; H04W 48/06; H04W 48/08; H04W 48/12; H04W 4/001; H04W 4/02; H04W 4/021; H04W 52/0235; H04W 52/0258; H04W 60/00; H04W 68/00; H04W 72/1226; H04W 76/048; H04W 8/12; H04W 88/02; Y02B 60/50; H04B 7/26; H04B 7/022; H04J 11/0093
USPC .......................................... 455/525, 436, 442
See application file for complete search history.

(56) References Cited

U.S. PATENT DOCUMENTS 7,480,519 B2   1/2009   Jeong et al.
8,045,989 B2 *  10/2011   Joo ............................... 455/446
(Continued)

FOREIGN PATENT DOCUMENTS

WO   2009004405 A1   1/2009

OTHER PUBLICATIONS

3GPP; Technical Specification Group Radio Access Network; Evolved Universal Terrestrial Radio Access (E-UTRA); Radio Resource Control (RRC); Protocol specification (Release 9), TS 36.331 V9.14.1, Mar. 2013, 262 pages.

*Primary Examiner* — Patrick Edouard
*Assistant Examiner* — B. M. M Hannan
(74) *Attorney, Agent, or Firm* — Slater Matsil, LLP

(57) ABSTRACT

Embodiments are provided for resolving, at a user equipment (UE), unnecessary frequent consecutive back and forth reselections between the same two or more network cells. In an embodiment method, upon detecting predefined criteria indicating reaching a threshold frequency of reselections between the same cells, the UE switches to a defined mobility state reducing the frequency of reselections between the same cells. In accordance with the defined mobility state, the method increases a waiting time for cell reselection. The predefined criteria includes detecting the UE in a defined Static-idle state, detecting a serving cell of the UE and a strongest neighbor cell having approximately equal signal quality for a defined duration or a defined number of consecutive measurements, and detecting a number of consecutive reselections between the same cells exceeding a defined minimum threshold.

17 Claims, 7 Drawing Sheets

(51) Int. Cl.
*H04W 48/16* (2009.01)
*H04W 88/02* (2009.01)
*H04W 48/20* (2009.01)

(56) References Cited

U.S. PATENT DOCUMENTS

| | | | |
|---|---|---|---|
| 2004/0082328 A1* | 4/2004 | Japenga et al. | 455/436 |
| 2006/0178158 A1* | 8/2006 | Muller | 455/515 |
| 2006/0258386 A1* | 11/2006 | Jeong | H04W 36/24 455/525 |
| 2010/0240356 A1* | 9/2010 | Lee et al. | 455/422.1 |
| 2012/0250548 A1 | 10/2012 | Swaminathan et al. | |
| 2013/0225169 A1* | 8/2013 | Farnsworth et al. | 455/436 |
| 2013/0237231 A1* | 9/2013 | Nagaraja et al. | 455/438 |
| 2014/0128083 A1* | 5/2014 | Esch et al. | 455/439 |
| 2014/0242993 A1* | 8/2014 | Dahlen et al. | 455/436 |
| 2014/0274063 A1* | 9/2014 | Singh | H04W 36/36 455/437 |
| 2014/0378134 A1* | 12/2014 | Nakamori et al. | 455/436 |
| 2015/0085829 A1* | 3/2015 | Bawaskar | 370/332 |

* cited by examiner

SYSTEM AND METHOD TO REDUCE POWER CONSUMPTION ASSOCIATED WITH CELL RESELECTION OPERATIONS

TECHNICAL FIELD

The present invention relates to the field of wireless communications, and, in particular embodiments, to a system and method for reducing power consumption associated with cell reselection operations.

BACKGROUND

Mobile device battery life is of growing importance for manufacturers, service providers and mobile device users. One significant battery consuming operation of mobile devices in idle state is cell reselection. As mobile data service becomes increasingly popular, service providers are deploying more base stations to increase network capacity. Thus, in modern mobile networks, a user equipment (UE), such as a smartphone, is in the coverage of increasingly more base stations, and experiences more system reselection and handover between the base stations and corresponding cells. Frequent back and forth cell reselection between the same two (or more) cells occurs in reselection regions where cell areas are overlapped and mobile devices become stationary or move slowly. Customer reports and field test show that frequent back and forth cell reselection between the same two (or more) cells is common, causing more battery power consumption and poor user experience. A scheme for reducing the number of unnecessary reselections is needed.

SUMMARY OF THE INVENTION

In accordance with an embodiment, a method implemented by a user equipment (UE) for reducing a frequency of reselections between a same group of cells in cellular networks includes, upon detecting predefined criteria indicating reaching a threshold frequency of reselections between the same two or more cells, switching to a defined mobility state that reduces the frequency of reselections between the same cells. The method further includes, in accordance with the defined mobility state, increasing a waiting time for cell reselection.

In accordance with another embodiment, a method implemented by a UE for reducing a frequency of reselections between a same group of cells in cellular networks includes performing cell measurements at each next defined time period, and selecting one of a plurality of mobility states in accordance with the cell measurements. The mobility states include a defined mobility state that increases the defined time period upon detecting criteria indicating reaching a threshold frequency of reselections between the same cells. The method further includes performing cell reselection upon detecting criteria for triggering cell reselection.

In accordance with another embodiment, a UE for reducing a frequency of reselections between a same group of cells in cellular networks includes at least one processor and a non-transitory computer readable storage medium storing programming for execution by the at least one processor. The programming includes instructions to, upon detecting predefined criteria indicating reaching a threshold frequency of reselections between the same cells, switch to a defined mobility state that reduces the frequency of reselections between the same cells. The programming includes further instructions to, in accordance with the defined mobility state, increase a waiting time for cell reselection.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Embodiments are provided herein for resolving, at a UE, unnecessary frequent consecutive back and forth reselections between same two or more cells. This back and force reselection between same or almost same cells is also referred to as a ping-pong scenario. The reselections may occur in regions where cell areas are overlapped and UEs are stationary or move slowly. A method and algorithm is provided to reduce the number of unnecessary reselections at the UE, which in turn reduces UE battery power consumption.

The disclosed systems and methods apply to any type of radio access technology (RAT) including Long Term Evolution (LTE), Wideband Code Division Multiple Access (WCDMA), Global System for Mobile Communications (GSM), Enhanced Voice-Data Optimized (EVDO) networks, and Wireless Network Extender (1X). Embodiments of the disclosed systems and methods also apply to intra-frequency cell reselection, inter-frequency cell reselection, and inter-RAT cell reselection.

A new mobility state, referred to herein as a Static-ping_pong state, is defined. The new mobility state is added to extend the mobility states defined in 3GPP/3GPP2 specification, including the Normal-mobility state, the Medium-mobility state, and the High-mobility state. The embodiments also define Static-ping_pong state detection criteria and new cell reselection parameter scaling rules. Embodiment schemes provided herein include mobility state transition for UE with two mobility states and four mobility states, intra-frequency reselection for two mobility states and four mobility states, and inter-frequency reselection for two mobility states and four mobility states.

Figure 1:
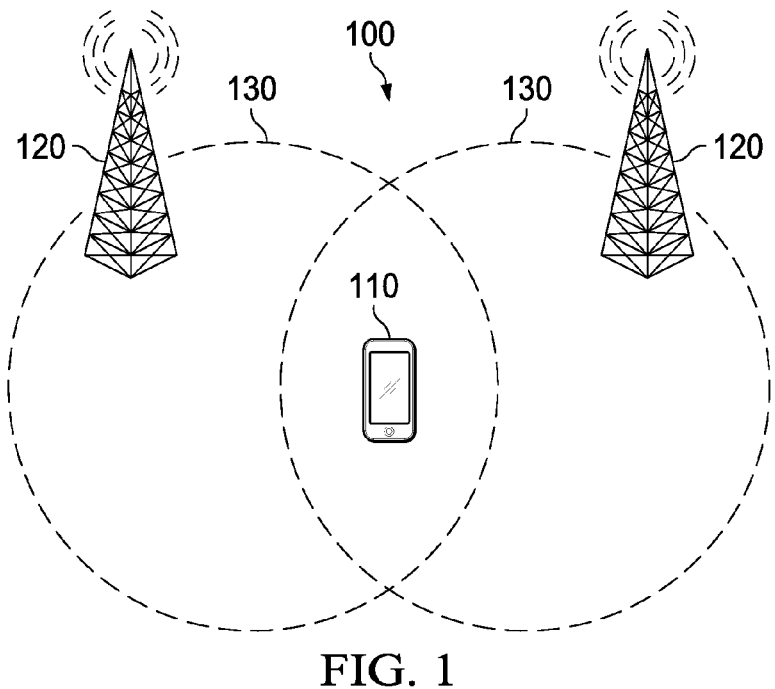
FIG. 1 illustrates an example of a possible ping-pong scenario.

FIG. 1 illustrates an example of a possible ping-pong scenario 100, where a UE 110 falls within the coverage ranges or cells 130 of at least two base stations 120 (e.g., eNBs) of one or more cellular networks. Examples of the UE include smartphones, computer tablets, computer laptops, other mobile computers/communication devices. If the UE 110 is static or moves slowly, then the UE 110 may be triggered to switch or reselect back and force between the cells 130, for instance if comparable or acceptable signal power is detected from the cells 130. A high frequency of back and forth reselection may consume substantial battery power of the UE 110 and may not be necessary since the UE 110 may be served adequately by one of the cells 130 without the need for further reselection or switching to another cell 130 in that area.

To reduce the frequency of reselections or unnecessary switching between cells, a Static-ping_pong is added to the mobility states that determine the operation state of a UE according to 3GPP/3GPP2 specifications. The UE may enter the Static-ping_pong state according to defined criteria. In an embodiment, if the UE or mobile device is in a defined Static-idle state, and if the serving cell and strongest neighbor cell/cells for a defined time period for $T_{CRspp}$ or for M (M is a predefined integer) consecutive measurements have approximately equal quality or approximately equal good or acceptable quality, and if the number of consecutive back and forth reselections between the same two or more cells (same cell is reselected just after one other reselection) during the time period $T_{CRspp}$ exceeds a defined threshold, $N_{CR\_SPP}$, then the UE enters the Static-ping_pong state. In an embodiment, a mobile device transitions from an idle state to a Static-idle state when change in a reference signal received power and a reference signal received quality of first J identified neighbor cells with a highest reference signal received power and a highest reference signal received quality is within a defined range in latest K consecutive measurement cycles, wherein J and K are integer values. The transition criteria can be used to define the Static-idle state. A mobile device transitions from the Static-idle state to the idle state when change of a reference signal receiver power and a reference signal received quality of first M identified neighbor cells with a highest reference signal received power and a highest reference signal received quality exceed a specified range in latest N consecutive measurement cycles, wherein M and N are integer values. The value $T_{CRspp}$ specifies the duration for evaluating the amount of cell reselections for Static-ping_pong state. The value $N_{CR\_SPP}$ specifies minimum number of cell reselections to enter Static-ping_pong state.

New cell reselection parameter scaling rules are used for implementing the Static-ping_pong state. In an embodiment, a new speed dependent ScalingFactor (sf-Static-ping_pong) is added for $Treselection_{EUTRAN}$, also referred to herein as TreselectionEUTRA. The terms $Treselection_{EUTRAN}$ and TreselectionEUTRA are used herein interchangeably to refer to the same parameter. The parameter is the waiting time for cell reselection procedure defined in 3GPP specifications. A LTE eNodeB (eNB) broadcasts TreselectionEUTRA over the air. The new scaling factor extends scaling factors defined by the 3GPP specifications from two scaling factors (sf-High; sf-Medium; sf-Static-ping_pong) to three scaling factors (sf-High; sf-Medium; sf-Static-ping_pong). Additionally, a new speed dependent ScalingFactor ($Q_{hyst}$-Static-ping_pong-Hyst) is added for hysteresis value $Q_{hyst}$. The value $Q_{hysts}$ specifies the hysteresis value for ranking criteria as defined in 3GPP specifications. The new scaling factor extends scaling factors defined in in 3GPP standards from two scaling factors (sf-High; sf-Medium) to three scaling factors (sf-High; sf-Medium; $Q_{hyst}$-Static-ping_pong-Hyst). If the UE enters the Static-ping_pong state, the reselection time interval TreselectionEUTRA and hysteresis value $Q_{hyst}$ for ranking criteria are increased, such as TreselectionEUTRA=f(T), TreselectionEUTRA+sf-Static-ping_pong, and $Q_{hyst}=Q_{hyst}+Q_{hyst}$-Static-ping_pong-Hyst. If the UE leaves the Static-ping_pong state, the reselection time interval TreselectionEUTRA is reset, and the UE follows the reselection time scaling rules defined by 3GPP specifications.

Figure 2:
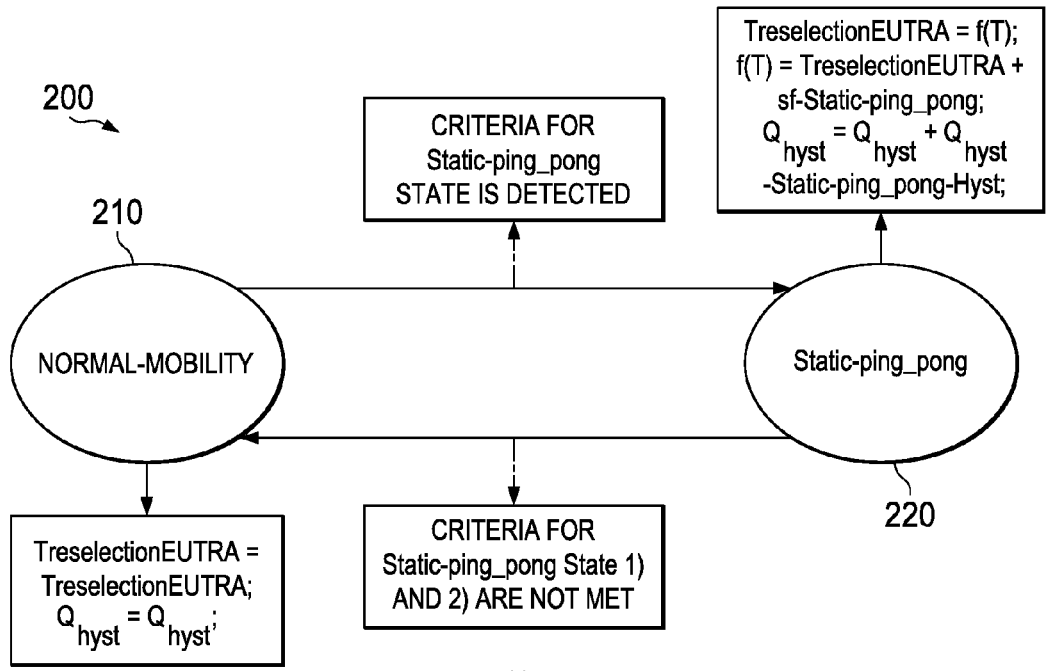
FIG. 2 illustrates an embodiment of mobility state transition evaluation by a UE for two supported mobility states including a static ping-pong state.

FIG. 2 illustrates an embodiment of mobility state transition evaluation 200 by a UE for two supported mobility states, including the Normal-mobility state 210 and the Static-ping_pong state 220. The UE may have only two mobility states, Normal-mobility state 210 and Static-ping_pong state 220, if the parameters ($T_{CRmax}$, $N_{CR\_H}$, $N_{CR\_M}$ and $T_{CRmaxHyst}$) are not sent in the serving cell system information. The UE enters the Static-ping_pong state 220 if the two criteria described above for Static-ping_pong state are detected. In the Static-ping_pong state 220, the UE takes defined actions. As such, the UE increases reselection time (parameter TreselectionEUTRA) and/or increases $Q_{hyst}$, independently or combined, as described above. The UE transfers to the Normal-mobility 210 state if an exit criterion for the Static-ping_pong 200 is met. The exit Static-ping_pong criterion is met when the following two conditions are not met: the UE is in Static-idle state, and the serving cell and strongest neighbor cell/cells for $T_{CRspp}$ have approximately equal quality or approximately equal good or acceptable quality. At the Normal-mobility state 210, the parameters TreselectionEUTRA and $Q_{hyst}$ are restored to their previous smaller values indicated in serving cell system information block and as specified in 3GPP standards.

Figure 3:
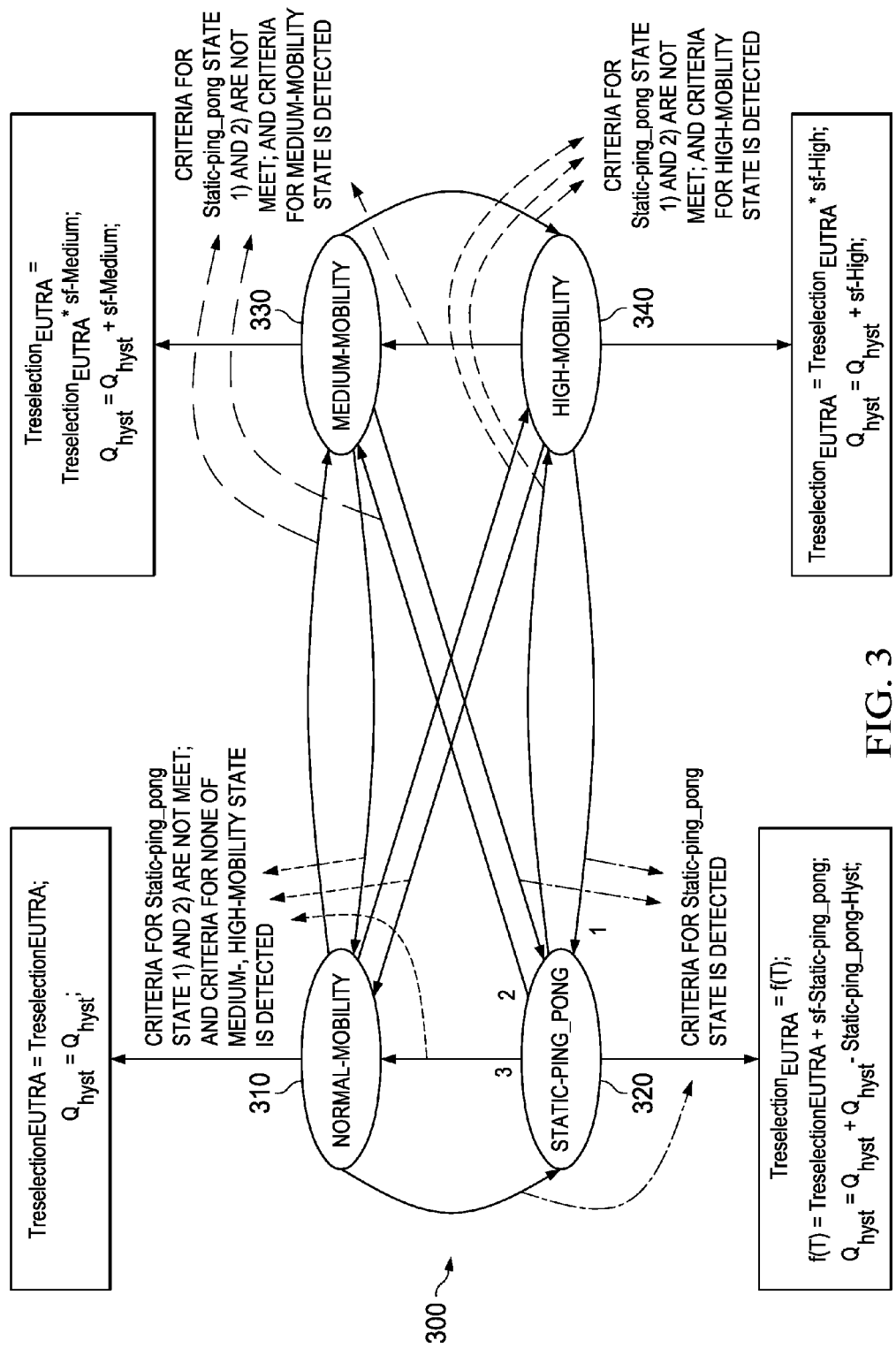
FIG. 3 illustrates another embodiment of mobility state transition evaluation by a UE for four supported mobility states including a static ping-pong state.

FIG. 3 illustrates another embodiment of mobility state transition evaluation 300 by a UE for supported mobility states including the Normal-mobility state 310, the Static-ping_pong state 320, the Medium-mobility state 330, and the High-mobility state 340. The UE may have such four mobility states if the parameters ($T_{CRmax}$, $N_{CR\_H}$, $N_{CR\_M}$ and $T_{CRmaxHyst}$) are sent in the serving cell system information. The UE enters the Static-ping_pong state 320 if the criteria defined above for Static-ping_pong state is detected. In the Static-ping_pong state 320, the UE can take the following actions (independently or combined): increase reselection time (parameter TreselectionEUTRA) and/or increase $Q_{hyst}$. If the exit Static-ping_pong state criterion described above is met, the UE exits from the Static-ping_pong state 320 and follows standards defined criteria to move into an according state. If criteria for High-mobility state 340 are detected according to standards, the UE enters the High-mobility state 340. At the High-mobility state 340, the original parameter TreselectionEUTRA is changed using sf-High value defined in 3GPP. The TreselectionEUTRA value is scaled down compared with the Static-ping_pong state, Normal-mobility state, and Medium-mobility state. The original parameter $Q_{hyst}$ is increased by the sf-High value defined in 3GPP. If the criteria for the Medium-mobility state 330 are detected, the UE enters the Medium-mobility state 330. At the Medium-mobility state 330, the original parameter TreselectionEUTRA is changed using sf-Medium value defined in 3GPP. The TreselectionEUTRA value is scaled down compared with the Static-ping_pong state and Normal-mobility state, or scaled up compared with the High-mobility state. The original parameter $Q_{hyst}$ is increased by the sf-Medium value defined in 3GPP. If none of the criteria for the Medium-mobility state 330 and High-mobility state 340 is detected during a time period $T_{CRmaxHyst}$, the UE enters the Normal-mobility state 310. At the Normal-mobility state 310, the parameters TreselectionEUTRA and $Q_{hyst}$ are restored to their previous values according to 3GPP specifications and the values received from its serving cell.

Adding the Static-ping_pong state as part of two supported or four supported mobility states, as described above, reduces needed or unnecessary cell reselections for UEs and improves UE battery life, such as in the case of mobile devices in reselection regions. This also provides better user experience. The reduction in frequency of reselections between same cells (ping-pong scenario) is achieved by scaling up or increasing the time and hysteresis determining the speed or frequency for cell reselection evaluation.

Figure 4:
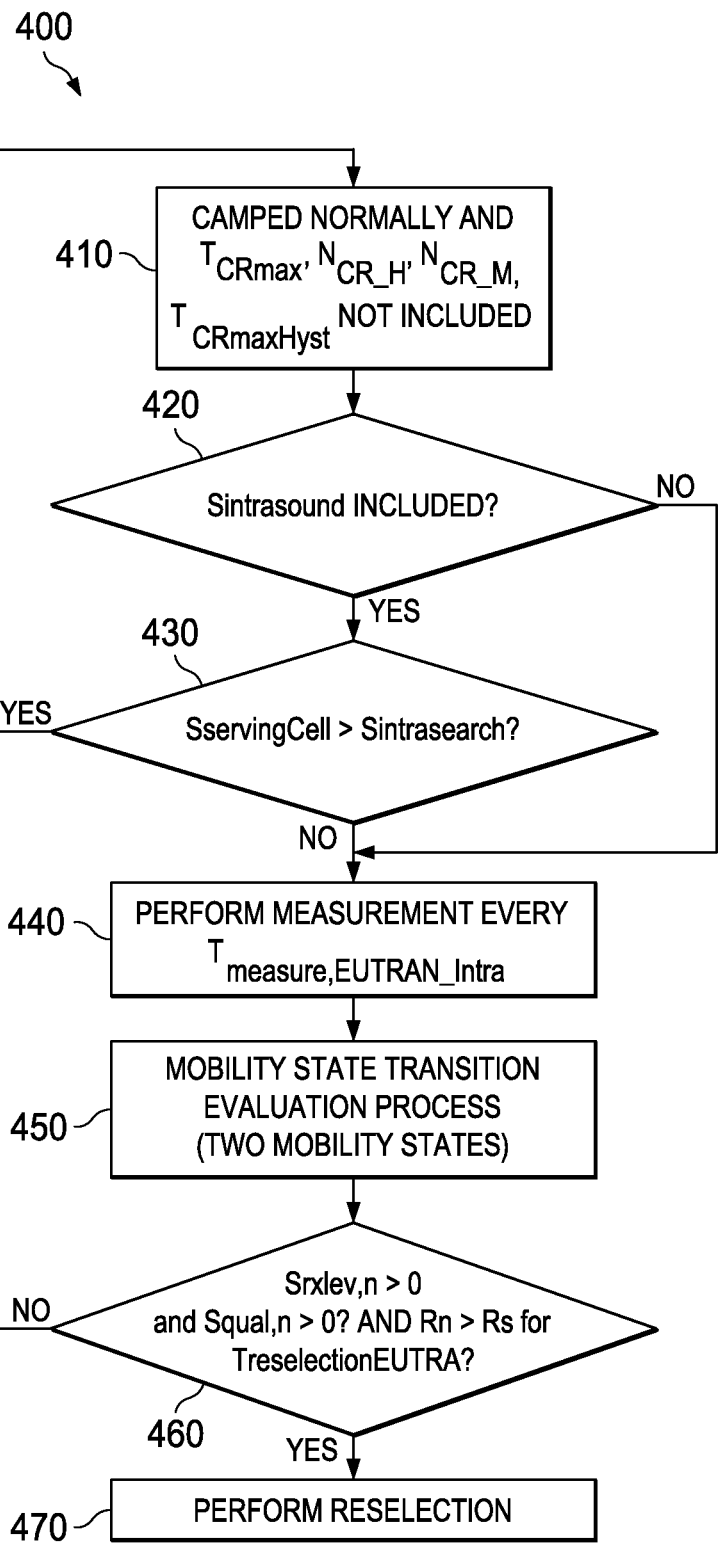
FIG. 4 illustrates an embodiment method for intra-frequency cell reselection.

FIG. 4 illustrates an embodiment method 400 for intra-frequency cell reselection in the case of two supported mobility states at a UE. The method 400 is implemented by a UE to reselect, within the same frequency, a cell according to parameters defined in 3GPP specifications and the new cell reselection parameter scaling rules. At step 410, the UE is camped normally (camped on a suitable cell and has normal/full services) and the parameters $T_{CRmax}$, $N_{CR\_H}$, $N_{CR\_M}$, $T_{CRmaxHyst}$ are not included, e.g., not sent in the serving cell system information. The $T_{CRmax}$ parameter specifies the duration for evaluating allowed amount of cell reselection(s). The $N_{CR\_H}$ parameter specifies the maximum number of cell reselections to enter High-mobility state. The $N_{CR\_M}$ parameter specifies the maximum number of cell reselections to enter Medium-mobility state. The $T_{CRmaxHyst}$ parameter specifies the additional time period before the UE can enter Normal-mobility state. At step 420, the UE determines if the parameter Sintrasearch is included (in the serving cell system information). The Sintrasearch parameter is for $S_{IntraSearchP}$ and $S_{IntraSearchQ}$ which are defined in 3GPP. The value $S_{IntraSearchP}$ specifies the Srxlev threshold for intra-frequency measurements, and $S_{IntraSearchQ}$ specifies the Squal threshold for intra-frequency measurements. If this parameter is included, then at step 430, the UE determines if the included parameters satisfy SservingCell>Sintrasearch, where SservingCell is the measured serving cell receiver level value and quality value. If the condition in step 430 is true, then the method 400 returns to step 410. If the condition in step 420 or the condition in step 430 is not true, then the method 400 proceeds to step 440. At step 440, the UE performs measurements every period equal to $T_{measure,EUTRAN\_Intra}$. At step 450, the UE performs mobility state transition evaluation for two mobility states, as described in the mobility state transition evaluation 200. At step 460, the UE determines if the included parameters Srxlev,n>0 and Squal,n>0, and if Rn>Rs for TreselectionEUTRA. The parameter Srxlev,n is the measured neighbor cell receiver level value, Squal,n is the measured neighbor cell quality value, Rn is the cell-ranking criterion for neighboring cell, Rs is the cell-ranking criterion for serving cell, and TreselectionEUTRA specifies the cell reselection timer value for E-UTRAN. If the conditions (both inequalities) in step 460 are true, then the method proceeds to step 470 to perform the reselection procedure. Otherwise, the UE returns to step 410 without reselection.

Figure 5:
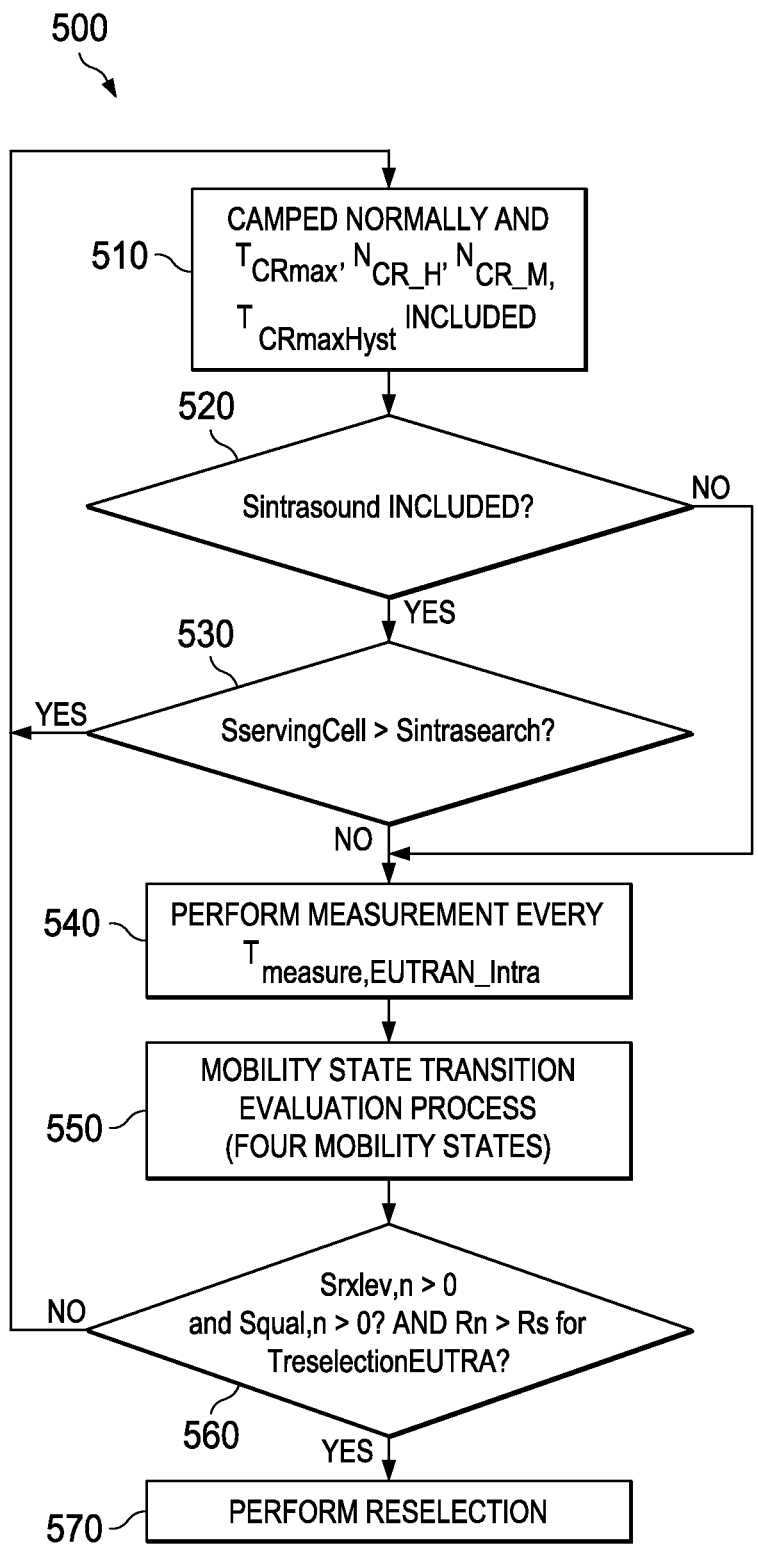
FIG. 5 illustrates another embodiment method for intra-frequency cell reselection.

FIG. 5 illustrates an embodiment method 500 for intra-frequency cell reselection in the case of four supported mobility states at a UE. The method 500 is implemented by a UE to reselect, within the same frequency, a cell according to parameters defined in 3GPP specifications and the new cell reselection parameter scaling rules. At step 510, the UE is camped normally and the parameters $T_{CRmax}$, $N_{CR\_H}$, $N_{CR\_M}$, $T_{CRmaxHyst}$ are included, e.g., sent in the serving cell system information. At step 520, the UE determines if the parameter Sintrasearch is included (in the serving cell system information). If this parameter is included, then at step 530, the UE determines if the included parameters satisfy SservingCell>Sintrasearch. If the condition in step 430 is true, then the method 500 returns to step 510. If the condition in step 520 or the condition in step 530 is not true, then the method 500 proceeds to step 540. At step 540, the UE performs measurements every period equal to $T_{measure,EUTRAN\_Intra}$. At step 550, the UE performs mobility state transition evaluation for four mobility states, as described in the mobility state transition evaluation 300. At step 560, the UE determines if the included parameters Srxlev,n>0 and Squal,n>0, and if Rn>Rs for TreselectionEUTRA. If the conditions (both inequalities) in step 460 are true, then the method proceeds to step 570 to perform the reselection procedure. Otherwise, the UE returns to step 510 without reselection.

Figure 6:
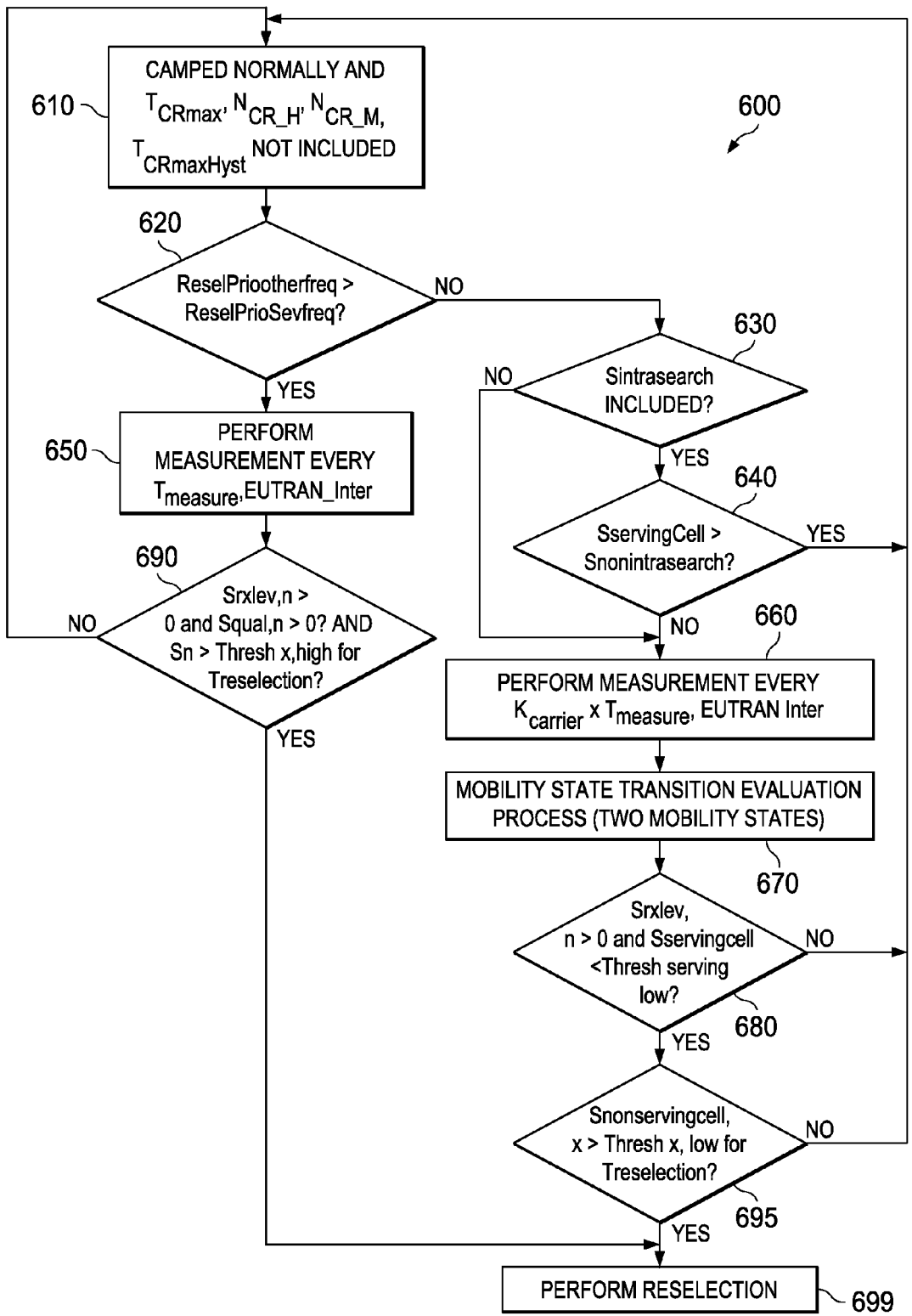
FIG. 6 illustrates an embodiment method for inter-frequency cell reselection.

FIG. 6 illustrates an embodiment method 600 for inter-frequency cell reselection in the case of two supported mobility states at a UE. The method 600 is implemented by a UE to switch between frequencies and reselect a cell according to parameters defined in 3GPP specifications and the new cell reselection parameter scaling rules. At step 610, the UE is camped normally and the parameters $T_{CRmax}$, $N_{CR\_H}$, $N_{CR\_M}$, $T_{CRmaxHyst}$ are not included, e.g., not sent in the serving cell system information. At step 620, the UE determines if the parameters satisfy the inequality ReselPriootherfreq>ReselPrioSevfreq, which indicates that the reselection priority of other frequency is greater than the reselection priority of the serving cell. The parameter If this is true, then the method proceeds to step 650. At step 650, the UE performs measurements every period equal to $T_{measure,EUTRAN\_Intra}$. Next, at step 690, the UE determines if the included parameters Srxlev,n>0 and Squal,n>0, and if Sn>Threshx,high for TreselectionRn. The parameter Sn is for $S_{nonIntraSearchP}$ and $S_{nonIntraSearchQ}$. The value $S_{nonIntraSearchP}$ specifies the Srxlev threshold for E-UTRAN inter-frequency and inter-RAT measurements, and $S_{nonIntraSearchQ}$ specifies the Squal threshold for E-UTRAN inter-frequency and inter-RAT measurements. The parameter Thresh x,high is for $Thresh_{X,\,HighP}$ and $Thresh_{X,\,HighQ}$. The value $Thresh_{X,\,HighP}$ specifies the Srxlev threshold used by the UE when reselecting towards a higher priority RAT/frequency than the current serving frequency, and $Thresh_{X,\,HighQ}$ specifies the Squal threshold used by the UE when reselecting towards a higher priority RAT/frequency than the current serving frequency. If the conditions (both inequalities) in step 690 are true, then the method proceeds to step 699 to perform the reselection procedure. Otherwise, the UE returns to step 610 without reselection.

If the condition in step 620 is not true, then the method proceeds to step 630. At step 630, the UE determines if the parameter Sintrasearch is included (in the serving cell system information). If this parameter is included, then at step 640, the UE determines if the included parameters satisfy the inequality SservingCell>Snonintrasearch. The parameter SservingCell is the measured serving cell receiver level value and quality, Snonintrasearch is for $S_{nonIntraSearchP}$ and $S_{nonIntraSearchQ}$. The value $S_{nonIntraSearchP}$ specifies the Srxlev threshold for E-UTRAN inter-frequency and inter-RAT measurements, and $S_{nonIntraSearchQ}$ specifies the Squal threshold for E-UTRAN inter-frequency and inter-RAT measurements. If the condition in step 640 is true, then the method 600 returns to step 610. If the condition in step 630 or the condition in step 640 is not true, then the method 600 proceeds to step 660. At step 660, the UE performs measurements every period equal to every Kcarrier× $T_{measure,EUTRAN\_Inter}$. The parameter $K_{carrier}$ is the number of E-UTRA inter-frequency carriers indicated by the serving cell. Next, at step 670, the UE performs mobility state transition evaluation for two mobility states, as described in the mobility state transition evaluation 200. At step 680, the UE determines if the parameters satisfy Srxlev,n>0 and Sservingcell<Thresh serving, low. The parameter Thresh serving, low is for $Thresh_{Serving,LowP}$ and $Thresh_{Serving,\ LowQ}$. The value $Thresh_{Serving,LowP}$ specifies the Srxlev threshold used by the UE on the serving cell when reselecting towards a lower priority RAT/frequency, and $Thresh_{Serving,\ LowQ}$ specifies the Squal threshold used by the UE on the serving cell when reselecting towards a lower priority RAT/frequency. If the conditions (both inequalities) in step 680 are true, then the method proceeds to step 695. Otherwise, the UE returns to step 610 without reselection. At step 695, the UE determines if the parameters satisfy Snonservingcell, x>Threshx, low for Treselection, which indicates that the Snonservingcell,x of a cell on evaluated frequency is greater than Thresh x, low for a time interval Treselection. The parameter Thresh x, low is for $Thresh_{X,\ LowP}$ and $Thresh_{X,\ LowQ}$. The value $Thresh_{X,\ LowP}$ specifies the Srxlev threshold used by the UE when reselecting towards a lower priority RAT/frequency than the current serving frequency, and $Thresh_{X,\ LowQ}$ specifies the Squal threshold (in dB) used by the UE when reselecting towards a lower priority RAT/frequency than the current serving frequency. If the condition in step 695 is true, then the method proceeds to step 699 to perform the reselection procedure. Otherwise, the UE returns to step 610 without reselection.

Figure 7:
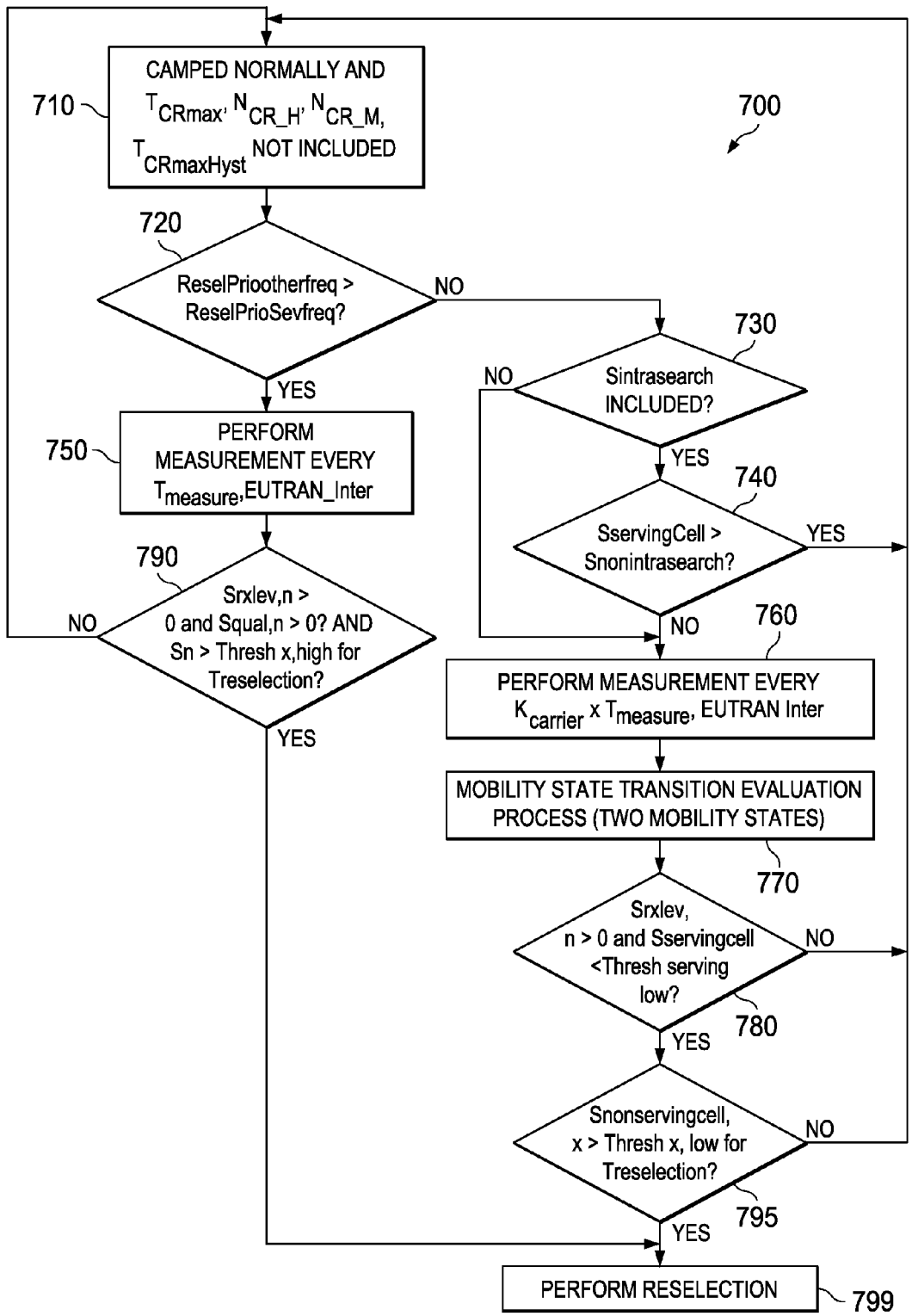
FIG. 7 illustrates another embodiment method for inter-frequency cell reselection.

FIG. 7 illustrates an embodiment method 700 for interfrequency cell reselection in the case of four supported mobility states at a UE. The method 700 is implemented by a UE to switch between frequencies and reselect a cell according to parameters defined in 3GPP specifications. At step 710, the UE is camped normally and the parameters $T_{CRmax}$, $N_{CR\_H}$, $N_{CR\_M}$, $T_{CRmaxHyst}$ are included, e.g., sent in the serving cell system information. At step 720, the UE determines if the parameters satisfy the inequality ReselPriootherfreq>ReselPrioSevfreq. If this is true, then the method proceeds to step 750. At step 750, the UE performs measurements every period equal to $T_{measure,EUTRAN\_Intra}$. Next, at step 790, the UE determines if the included parameters Srxlev,n>0 and Squal,n>0, and if Sn>Thresh x,high for TreselectionRn. If the conditions (both inequalities) in step 790 are true, then the method proceeds to step 799 to perform the reselection procedure. Otherwise, the UE returns to step 710 without reselection.

If the condition in step 720 is not true, then the method proceeds to step 730. At step 730, the UE determines if the parameter Sintrasearch is included (in the serving cell system information). If this parameter is included, then at step 740, the UE determines if the included parameters satisfy the inequality SservingCell>Snonintrasearch. If the condition in step 740 is true, then the method 700 returns to step 710. If the condition in step 730 or the condition in step 740 is not true, then the method 700 proceeds to step 660. At step 660, the UE performs measurements every period equal to every Kcarrier× $T_{measure,EUTRAN\_Inter}$. Next, at step 770, the UE performs mobility state transition evaluation for four mobility states, as described in the mobility state transition evaluation 300. At step 780, the UE determines if the parameters satisfy Srxlev,n>0 and Sservingcell<Thresh serving, low. If the conditions (both inequalities) in step 780 are true, then the method proceeds to step 795. Otherwise, the UE returns to step 710 without reselection. At step 795, the UE determines if the parameters satisfy Snonservingcell,x>Thresh x, low for Treselection. If the condition in step 795 is true, then the method proceeds to step 799 to perform the reselection procedure. Otherwise, the UE returns to step 710 without reselection.

Figure 8:
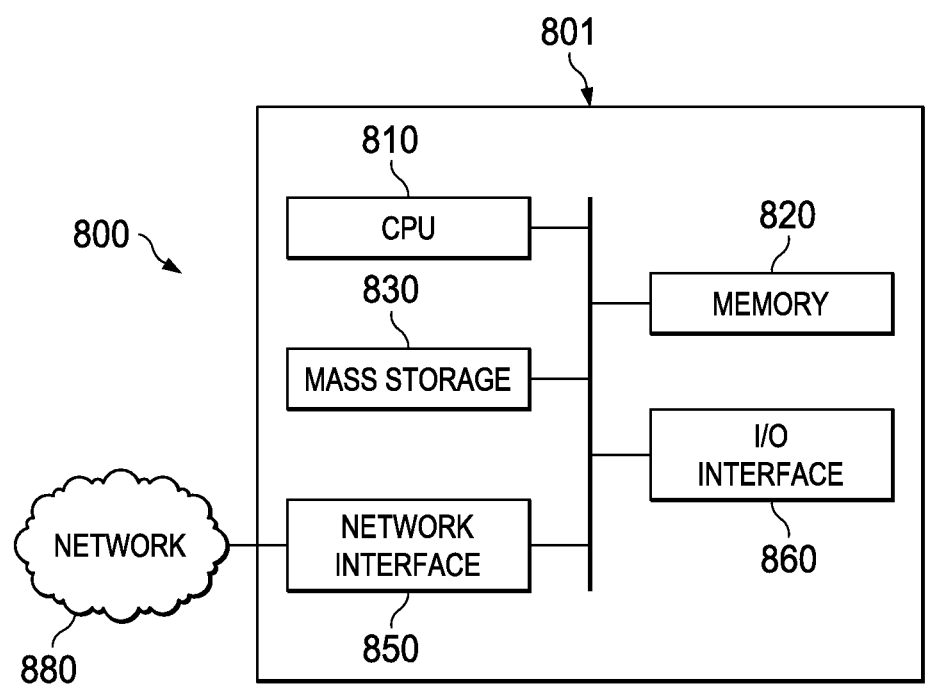
FIG. 8 is a diagram of an exemplary processing system that can be used to implement various embodiments.

FIG. 8 is a block diagram of an exemplary processing system 800 that can be used to implement various embodiments. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 800 may comprise a processing unit 801 equipped with one or more input/output devices, such as a network interfaces, storage interfaces, and the like. The processing unit 801 may include a central processing unit (CPU) 810, a memory 820, a mass storage device 830, and an I/O interface 860 connected to a bus. The bus may be one or more of any type of several bus architectures including a memory bus or memory controller, a peripheral bus or the like.

The CPU 810 may comprise any type of electronic data processor. The memory 820 may comprise any type of system memory such as static random access memory (SRAM), dynamic random access memory (DRAM), synchronous DRAM (SDRAM), read-only memory (ROM), a combination thereof, or the like. In an embodiment, the memory 820 may include ROM for use at boot-up, and DRAM for program and data storage for use while executing programs. In embodiments, the memory 820 is non-transitory. The mass storage device 830 may comprise any type of storage device configured to store data, programs, and other information and to make the data, programs, and other information accessible via the bus. The mass storage device 830 may comprise, for example, one or more of a solid state drive, hard disk drive, a magnetic disk drive, an optical disk drive, or the like.

The processing unit 801 also includes one or more network interfaces 850, which may comprise wired links, such as an Ethernet cable or the like, and/or wireless links to access nodes or one or more networks 880. The network interface 850 allows the processing unit 801 to communicate with remote units via the networks 880. For example, the network interface 850 may provide wireless communication via one or more transmitters/transmit antennas and one or more receivers/receive antennas. In an embodiment, the processing unit 801 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a user equipment (UE) for reducing a frequency of reselections between the same group of cells in cellular networks, the method comprising:
   detecting a predefined criteria indicating reaching a threshold frequency of reselections between the same group of cells, wherein detecting the predefined criteria includes:
      detecting the UE in a defined Static-idle state,
      detecting the UE entering a ping-pong state by detecting a serving cell of the UE and a strongest neighbor cell having approximately equal signal quality for a defined duration or a defined number of consecutive measurements, and
      detecting a number of consecutive reselections between the same cells exceeding a defined minimum threshold;
   after detecting the predefined criteria, switching to a defined mobility state that reduces the frequency of reselections between the same cells; and
   in accordance with the defined mobility state, increasing a waiting time for cell reselection and increasing a ranking criteria of the serving cell.

2. The method of claim 1, wherein the defined mobility state is a Static-ping_pong state and one of two mobility states supported by the UE, the two mobility states further including a Normal-mobility state defining a reduced waiting time in comparison to the Static-ping_pong state.

3. The method of claim 2 further comprising:
   upon detecting predefined criteria for exiting the Static-ping_pong state, switching from the Static-ping_pong state to the Normal-mobility state; and
   changing the waiting time for cell reselection to a previous shorter time value as indicated in a received serving cell system information block.

4. The method of claim 3, wherein detecting predefined criteria for exiting the Static-ping_pong state comprises detecting the UE not in a defined Static-idle state and detecting the serving cell and a strongest neighbor cell not having approximately equal signal quality for a defined duration.

5. The method of claim 1, wherein the defined mobility state is a Static-ping_pong state and one of four mobility states supported by the UE, the four mobility states further including a Normal-mobility state defining a reduced waiting time in comparison to the Static-ping_pong state, a Medium-mobility state defining another reduced waiting time in comparison to the Normal-mobility state, and a High-mobility state defining yet another reduced waiting time in comparison to the Medium-mobility state.

6. The method of claim 5 further comprising, upon detecting predefined criteria for exiting the Static-ping_pong state, switching from the Static-ping_pong state to the High-mobility state after detecting criteria for the High-mobility state, to the Medium-mobility state after detecting criteria for the Medium-mobility state, or otherwise to the Normal-mobility state.

7. The method of claim 1, wherein increasing the waiting time for cell reselection includes adding, to a waiting time parameter for cell reselection, a defined scaling factor.

8. The method of claim 1, wherein the ranking criteria comprises a defined scaling factor to a hysteresis parameter for cell reselection, the hysteresis parameter specifying a hysteresis value for ranking criteria.

9. A method implemented by a user equipment (UE) for reducing a frequency of reselections between the same group of cells in cellular networks, the method comprising:
   performing cell measurements at each next defined time period;
   selecting one of a plurality of mobility states in accordance with the cell measurements, the mobility states including a defined mobility state that increases the defined time period and a ranking criteria of a serving cell after detecting a criteria indicating reaching a threshold frequency of reselections between the same group of cells, wherein detecting the criteria indicating reaching the threshold frequency of reselections between the same cells includes:
      detecting the UE in a static idle state,
      detecting the UE entering a ping-pong state by detecting a serving cell of the UE and a strongest neighbor cell having approximately equal signal quality for a defined duration or a defined number of consecutive measurements, and
      detecting a number of consecutive reselections between the same cells exceeding a defined minimum threshold; and
   performing cell reselection upon detecting criteria for triggering cell reselection.

10. The method of claim 9, wherein detecting the criteria for triggering cell reselection includes detecting a measured receiver level value of a neighbor cell exceeding a measured quality value of the neighbor cell, and further detecting a cell-ranking criterion for the neighbor cell exceeding a cell-ranking criterion for a serving cell of the UE for the defined time period.

11. The method of claim 9, wherein the ranking criteria comprises a hysteresis parameter for cell reselection by a defined scaling factor, the hysteresis parameter specifying a hysteresis value for ranking criteria.

12. The method of claim 9, wherein the mobility states are two states including the defined mobility state and a Normal-mobility state defining a reduced waiting time in comparison to the defined mobility state.

13. The method of claim 9, wherein the mobility states are four states including the defined mobility state and a Normal-mobility state defining a reduced waiting time less than that of the defined mobility state, a Medium-mobility state defining another reduced waiting time in comparison to the Normal-mobility state, and a High-mobility state defining yet another reduced waiting time in comparison to the Medium-mobility state, and wherein the method further comprises receiving a first parameter specifying a duration for evaluating allowed amount of cell reselections, a second parameter specifying a maximum number of cell reselections to enter the High-mobility state, a third parameter specifying a maximum number of cell reselections to enter the Medium-mobility state, and a fourth parameter specifying an additional time period before the UE is allowed to enter the Normal-mobility state.

14. A user equipment (UE) for reducing a frequency of reselections between the same group of cells in cellular networks, the UE comprising:
- at least one processor; and
- a non-transitory computer readable storage medium storing programming for execution by the at least one processor, the programming including instructions to:
- detect a predefined criteria indicating reaching a threshold frequency of reselections between the same group of cells, wherein detecting the predefined criteria indicating reaching the threshold frequency of the reselections between the same cells includes instructions:
  - to detect the UE in a defined Static-idle state,
  - to detect the UE entering a ping-pong state by detecting a serving cell of the UE and a strongest neighbor cell having approximately equal signal quality for a defined duration or a defined number of consecutive measurements, and
  - to detect a number of consecutive reselections between the same cells exceeding a defined minimum threshold;
- after detecting the predefined criteria, switch to a defined mobility state that reduces the frequency of reselections between the same cells; and
- in accordance with the defined mobility state, increase a waiting time for cell reselection and increase a ranking criteria of the serving cell.

15. The UE of claim 14, wherein the programming includes further instructions to:
- upon detecting the predefined criteria for exiting the defined mobility state, switch from the defined mobility state to another mobility state; and
- change the waiting time for cell reselection to a previous shorter time value as indicated in a received serving cell system information block.

16. The UE of claim 15, wherein instructions to detect predefined criteria for exiting the defined mobility state include instructions to detect the UE not in a defined Static-idle state and detect the serving cell and a strongest neighbor cell not having approximately equal signal quality for a defined duration.

17. The UE of claim 14, wherein the ranking criteria comprises a defined scaling factor to a hysteresis parameter for cell reselection, the hysteresis parameter specifying a hysteresis value for ranking criteria.

* * * * *